(12) United States Patent
Utsumi et al.

(10) Patent No.: US 12,462,267 B2
(45) Date of Patent: Nov. 4, 2025

(54) PREDICTION SYSTEM AND PREDICTION METHOD

(71) Applicant: Hitachi, Ltd., Tokyo (JP)

(72) Inventors: Masato Utsumi, Tokyo (JP); Tohru Watanabe, Tokyo (JP); Ikuo Shigemori, Tokyo (JP); Tetsu Ito, Tokyo (JP); Daisuke Hamaba, Tokyo (JP); Jun Yamazaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 89 days.

(21) Appl. No.: 17/911,155

(22) PCT Filed: Jan. 15, 2021

(86) PCT No.: PCT/JP2021/001254
§ 371 (c)(1),
(2) Date: Sep. 13, 2022

(87) PCT Pub. No.: WO2021/260982
PCT Pub. Date: Dec. 30, 2021

(65) Prior Publication Data
US 2023/0027383 A1   Jan. 26, 2023

(30) Foreign Application Priority Data
Jun. 22, 2020   (JP) .................................. 2020-107291

(51) Int. Cl.
*G06Q 10/00* (2023.01)
*G06Q 30/0202* (2023.01)

(52) U.S. Cl.
CPC ................. *G06Q 30/0202* (2013.01)

(58) Field of Classification Search
None
See application file for complete search history.

(56) References Cited

U.S. PATENT DOCUMENTS

| 2012/0191262 A1* | 7/2012 | Marcus | G05B 15/02 |
| | | | 700/286 |
| 2017/0116530 A1* | 4/2017 | Modarresi | G06Q 10/04 |

(Continued)

FOREIGN PATENT DOCUMENTS

| CN | 104463358 A | 3/2015 |
| CN | 110263823 A | 9/2019 |

(Continued)

OTHER PUBLICATIONS

Khan, Prince, Machine Learning-Based Approach to Predict Energy Consumption of Renewable and Nonrenewable Power Sources, Sep. 11, 2020, MDPI energies, https://www.mdpi.com/1996-1073/13/18/4870, p. 1-16. (Year: 2020).*

(Continued)

*Primary Examiner* — Joseph M Waesco
(74) *Attorney, Agent, or Firm* — Mattingly & Malur, PC (57) ABSTRACT

A system performs factor selection processing, which includes performing a factor selection operation for selecting one or two or more factors from one or a plurality of factors; factor filtering processing which includes: determining, about each of the one or the plurality of factors before the factor selection processing is performed, whether a factor value for prediction input to a prediction model is within a range of a plurality of factor values for specimen used to identify the prediction model; and excluding a factor, a result of the determination of which is false, and outputting a factor not excluded; and prediction processing which includes calculating the prediction value of the prediction target by inputting, to the prediction model, a factor value for prediction about each of one or more factors including the factor selected in the factor selection processing and not including the factor excluded in the factor filtering processing.

8 Claims, 5 Drawing Sheets

(56) References Cited

U.S. PATENT DOCUMENTS

| | | | |
|---|---|---|---|
| 2017/0243140 A1* | 8/2017 | Achin | G06F 9/5011 |
| 2017/0364803 A1* | 12/2017 | Calmon | G06N 3/045 |
| 2018/0046926 A1* | 2/2018 | Achin | G06F 9/5011 |
| 2019/0139059 A1* | 5/2019 | Shiga | G06N 20/00 |
| 2019/0318253 A1* | 10/2019 | Maekawa | G06Q 10/04 |
| 2020/0160180 A1* | 5/2020 | Lehr | G06N 3/08 |
| 2020/0241490 A1* | 7/2020 | Jermann | G05B 13/041 |
| 2020/0257992 A1* | 8/2020 | Achin | G06Q 10/04 |
| 2020/0320381 A1* | 10/2020 | Venkatraman | G06Q 10/067 |
| 2021/0018198 A1* | 1/2021 | Alanqar | F24F 11/65 |

FOREIGN PATENT DOCUMENTS

| | | | |
|---|---|---|---|
| CN | 110378520 A | 10/2019 | |
| CN | 110458374 A | 11/2019 | |
| JP | 2010282547 A | 12/2010 | |
| JP | 2015179454 A | 10/2015 | |
| JP | 2019087027 A | 6/2019 | |

OTHER PUBLICATIONS

Australian Office Action received in corresponding Australian Application No. 2021294867 dated Sep. 12, 2023.

Kusiak, Andrew et al., "Models for Monitoring Wind Farm Power", Renewable Energy 34, 2009, p. 583-590.

Zhao, Yongning et al., "Data-Driven Correction Approach to Refine Power Curve of Wind Farm Under Wind Curtailment", IEEE Transactions on Sustainable Energy, Jan. 2018, pp. 95-105, vol. 9, No. 1.

Sideratos, George et al., "An Advanced Statistical Method for Wind Power Forecasting", IEEE Transactions on Power Systems, Feb. 2007, vol. 22.

International Search Report of PCT/JP2021/001254 dated Apr. 13, 2021.

Australian Office Action received in corresponding Australian Application No. 2021294867 dated Mar. 18, 2024.

Gigoni, L. et al., "A Scalable Predictive Maintenance Model for Detecting Wind Turbine Component Failures Based on SCADA Data", 2019 IEEE Power & Energy Society General Meeting (PESGM), Aug. 4-8, 2019, Atlanta, GA, USA.

Extended European Search Report received in corresponding European Application No. 21829969.1 dated May 22, 2024.

* cited by examiner

PREDICTION SYSTEM AND PREDICTION METHOD

TECHNICAL FIELD

The present invention generally relates to a technique for predicting a future value about a prediction target (for example, a power demand or a market price).

BACKGROUND ART

In an energy business field such as a power business or a gas business, a communication business field, a transportation business field such as taxi or delivery, values about various prediction targets such as a demand are predicted in order to perform equipment operation and resource distribution adjusted to demand of consumers.

For example, it is known that power demand is affected by temperature. In this case, a prediction model of power demand is identified using outdoor temperature as an explanatory variable (an example of a factor). When the power demand serving as a prediction target is the power demand about a wide area, outdoor temperatures at a plurality of points can be used as a plurality of factors. The power demand is sometimes affected by weather-related items other than the outdoor temperature. Therefore, a plurality of factors are present as factors of the power demand. When the number of factors is large, it is possible to improve the accuracy of a predicted value by selecting factors used to identify the prediction model. Note that, in the present specification, a "factor value" is a value obtained about a factor. For example, when the factor is outdoor temperature, the factor value is a value such as 29° C. or 30° C.

A method disclosed in Patent Literature 1 generates an input and output model representing a relation between each of input variables and an output variable, generates sensitivity of each input variable to the output variable, and selects and presents the input variable based on the sensitivity.

A method disclosed in Patent Literature 2 generates a point model for outputting demand prediction values at a plurality of points in a geographical range having the points and generates an overall model based on a coefficient, which is set based on contributions of weather values at the points to a demand prediction value, and the point model.

The method disclosed in Patent Literature 3 respectively identifies prediction models for calculating prediction values using process data as input variables, respectively calculates prediction values from the plurality of identified prediction models, and diagnoses, for each of the plurality of identified prediction models, presence or absence of an abnormality of the process data used as the input variable. The method sets such that a prediction model including, as an input variable, process data diagnosed as having an abnormality is not to be used, and selects a prediction value predicted by a prediction model according to preset priority levels of the plurality of prediction models.

CITATION LIST

Patent Literature

[Patent Literature 1] Japanese Patent Laid-Open No. 2010-282547
[Patent Literature 2] Japanese Patent Laid-Open No. 2019-87027
[Patent Literature 3] Japanese Patent Laid-Open No. 2015-179454

SUMMARY OF INVENTION

Technical Problem

When a prediction model is identified using a selected factor, the prediction model is optimized (learned) to match past specimens of factors most. As a result, high prediction accuracy can be obtained within a range of values of the past specimens. When a prediction value is output from the identified prediction model, a factor value for prediction, on which the prediction value is based, needs to be input.

However, the following first and second problems are conceivable.

The first problem is that, when a factor value for prediction input about a selected factor is outside a range of specimens (past values) used to identify a prediction model, since extrapolation processing outside the specimen range is performed, a large error sometimes occurs in a prediction value output from the prediction model.

The second problem is that if a factor value obtained about a certain point in time is outside a specimen range but a factor value of the same magnitude is obtained after sufficient specimens (factor values) are accumulated after some time, the factor value could be within the specimen range, that is, some factors have time dependency on the size of the specimen range.

Patent Literatures 1 and 2 do not disclose methods of coping with any of the first and second problems. Therefore, there is a problem in that it is difficult to obtain an accurate prediction value.

In Patent Literature 3, since process data is the target, no factors have time dependency on a specimen range. Therefore, the method disclosed in Patent Literature 3 is not suitable for a scene in which the second problem occurs.

The present invention has been made in view of the above points, and an object of the present invention is to reduce a prediction error due to a factor having time dependency on a specimen range.

Solution to Problem

A system performs factor selection processing, factor filtering processing, and prediction processing. The factor selection processing includes performing a factor selection operation, which is an operation for selecting one or two or more factors from one or a plurality of factors. The factor filtering processing includes: determining, about each of the one or the plurality of factors before the factor selection processing is performed, whether a factor value for prediction input to a prediction model to calculate a prediction value of a prediction target is within a range of a plurality of factor values for specimen used to identify the prediction model; and excluding a factor, a result of the determination of which is false, and outputting a factor not excluded. The prediction processing includes calculating the prediction value of the prediction target by inputting, to the prediction model, a factor value for prediction about each of one or more factors including the factor selected in the factor selection processing and not including the factor excluded in the factor filtering processing.

Advantageous Effect of Invention

According to the present invention, it is possible to reduce a prediction error due to a factor having time dependency in a specimen range.

DESCRIPTION OF EMBODIMENTS

In the following explanation, an "interface device" may be one or more interface devices. The one or more interface devices may be at least one of the following.
  One or more I/O (Input/Output) interface devices. The I/O (Input/Output) interface device is an interface device for at least one of an I/O device and a remote computer for display. The I/O interface device for the computer for display may be a communication interface device. At least one I/O device may be any one of user interface devices, for example, an input device such as a keyboard or a pointing device and an output device such as a display device.
  One or more communication interface devices. The one or more communication interface devices may be one or more communication interface devices of the same type (for example, one or more NICs (Network Interface Cards) or may be two or more communication interface devices of different types (for example, an NIC and an HBA (Host Bus Adapter)).

In the following explanation, a "memory" is one or more memory devices and may be typically a main storage device. At least one memory device in the memory may be a volatile memory device or may be a nonvolatile memory device.

In the following explanation, a "permanent storage apparatus" is one or more permanent storage devices. The permanent storage device is typically a nonvolatile storage device (for example, an auxiliary storage device) and is, specifically, for example, a HDD (Hard Disk Drive) or an SSD (Solid State Drive).

In the following explanation, a "storage apparatus" may be at least the memory of the memory and the permanent storage apparatus.

In the following explanation, a "processor" is one or more processor devices. At least one processor device is typically a microprocessor device such as a CPU (Central Processing Unit) but may be a processor device of another type such as a GPU (Graphics Processing Unit). The at least one processor device may be a single core or may be a multicore. The at least one processor device may be a processor core. The at least one processor device may be a processor device in a broad sense that performs a part or entire processing, such as a hardware circuit (for example, an FPGA (Field Programmable Gate Array) or an ASIC (Application Specific Integrated Circuit).

In the following explanation, a function is sometimes explained with an expression of "yyy unit". The function may also be realized by one or more computer programs being executed by the processor, may also be realized by one or more hardware circuits (for example, FPGAs or ASICs), or may also be realized by a combination of the one or more computer programs and the one or more hardware circuits. When the function is realized by the program being executed by the processor, since decided processing is performed using the storage device and/or the interface device or the like as appropriate, the function may be at least a part of the processor. Processing explained using the function as a subject of the processing may be performed by the processor or an apparatus including the processor. The program may be installed from a program source. The program source may be, for example, a recording medium (for example, a non-transitory recording medium) readable by a program distribution computer or a computer. Explanation of each function is merely an example. A plurality of functions may also be integrated into one function, or one function may be divided into a plurality of functions.

Several embodiments of the present invention are explained in detail below with reference to the drawings.

Figure 1:
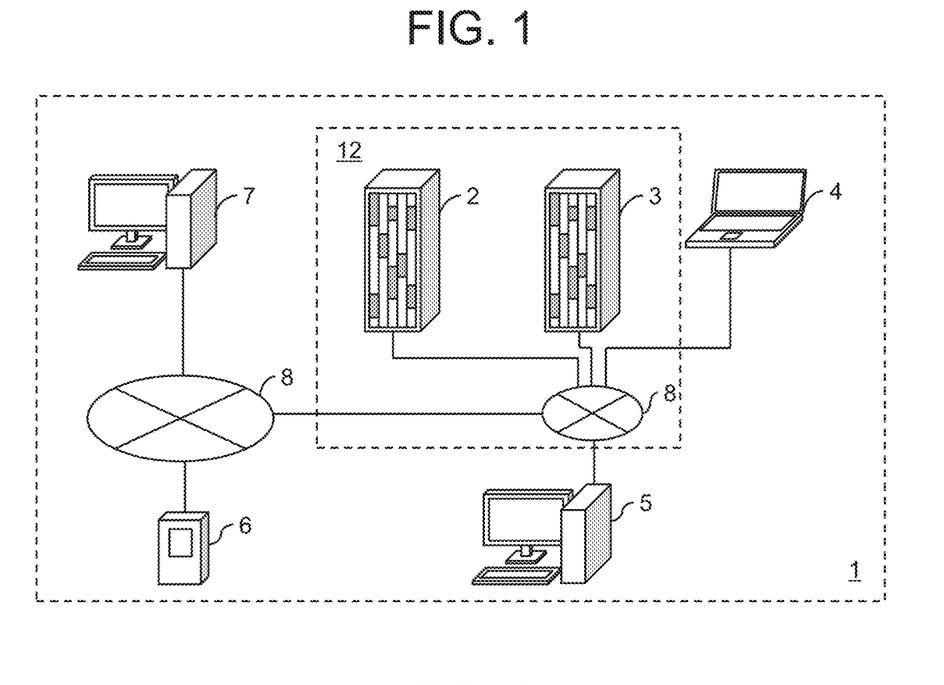
FIG. 1 is a diagram showing a configuration example of a data management system according to a first embodiment.

(1) First Embodiment (1-1) Configuration of a Data Management System According to this Embodiment In FIG. 1, a reference numeral 1 indicates the data management system according to this embodiment as a whole. When the data management system 1 is applied to, for example, a power business field, the data management system 1 predicts values such as power demand, power generation, and a market transaction price in a predetermined period of time in the future based on a result amount of power demand in the past and enables, based on the predicted values, management of power demand and supply such as planning and execution of an operation schedule of a generator and planning and execution of a procurement and transaction schedule for electric power from other electric companies.

The data management system 1 comprises a prediction system 12 (for example, a prediction operation apparatus 2 and a data management apparatus 3), a schedule management apparatus 5, an information input/output terminal 4, a data observation apparatus 6, and a data distribution apparatus 7. A communication path 8 is a communication network such as a LAN (Local Area Network) or a WAN (Wide Area Network) and is a communication path for connecting various apparatuses and terminals configuring the data management system 1 to be capable of communicating with one another.

The data management apparatus 3 stores data for specimen of a prediction target and factors and data for prediction of the factors, all used to calculate a prediction value of a prediction target.

The data for specimen of the prediction target includes at least prediction target data for specimen, which is observation data in the past of the prediction target observed over time. The data for specimen of the factors includes at least factor data for specimen, which is observation data in the past of various factors that are likely to affect an increase or decrease in a value of the prediction target. The data for prediction of the factors includes at least data for prediction of each of the factors included in the factor data for specimen.

The prediction target may be, for example, energy consumption such as electric power, gas, or water service; a power generation output of energy such as solar power generation or wind power generation; or a transaction amount or a transaction price of energy traded in a wholesale exchange. In fields other than the power business field, the prediction target may be a communication amount measured in a communication base station or the like, a position information history of a mobile body such as an automobile. These data for specimen may be data in measurement device units or data as a total of a plurality of measurement devices.

The factors may be weather-related items such as temperature, humidity, solar radiation, wind velocity, and air pressure; fuel-related items such as transaction amounts and transaction prices of crude oil, natural gas, and the like; power transmission line-related items such as a power transmission capacity of a power transmission line; items relating to a generator operation situation such as operation or a maintenance schedule of a generator; calendar day-related items such as flag values indicating year, month, and day, a day of week, and a type of an optionally set day; items relating to presence or absence of occurrence of accidental incidents such as a typhoon and an event; economic situations such as the number of consumers of energy, an industrial trend and a business survey index; items relating to movement situations of people and moving bodies such as a vehicle occupancy, the number of passengers, and the number of reserved seats of a super express train or a road traffic situation; or items such as the number of communication terminals connected to a communication base station. A part of the factors may be the prediction targets described above. In that case, a factor value may be an observation value itself in the past, a prediction value itself at a prediction target date and time, or the like.

The data management apparatus 3 stores data for specimen from a past date and time set in advance via the information input/output terminal 4 to the latest observation date and time. The data management apparatus 3 performs retrieval and transmission of data for specimen according to a data acquisition request from another apparatus.

The prediction operation apparatus 2 performs prediction using the data stored in the data management apparatus 3. Details of the prediction operation apparatus 2 are explained below.

The schedule management apparatus 5 performs, based on prediction result data output by the prediction operation apparatus 2, creation and execution of an operation schedule of physical equipment for achieving a predetermined target. The operation schedule of the physical equipment may be, in an energy field, for example, an operation schedule of a generator based on a predicted energy demand value, a predicted power generation output, and a predicted market transaction price in the future. Specifically, the operation schedule may be a schedule of the number of started generators and output distribution of the generators or a distribution schedule of a flow rate and pressure of gas or water fed to a gas pipe or a water pipe. Alternatively, in adjustment control for power demand called demand response, the operation schedule may be a schedule of demand adjustment amount distribution for power consumers participating in the demand response or power demand by equipment of the power consumers. In a communication field, the operation schedule may be, for example, a control schedule for the number of communication terminals connected to communication base stations not to exceed a storage capacity of the communication base stations. In a transportation field, the operation schedule may be, for example, a car allocation schedule for taxis that can satisfy a predicted number of users.

Note that the operation schedule of equipment is not limited to direct execution by an entity who uses the schedule management apparatus 5 and may be realized in an indirect form. In a power field, the indirect form of operation of equipment may be, for example, operation of physical equipment by a third party based on a direct mutual transaction agreement or a transaction agreement via an exchange. In this case, an execution schedule of the transaction agreement is equivalent to the operation schedule of equipment.

The information input/output terminal 4 performs data input to the prediction operation apparatus 2, the data management apparatus 3, and the schedule management apparatus 5; and display of data stored in or output by the apparatuses. The data observation apparatus 6 periodically measures or collects prediction target data for specimen, factor data for specimen, and factor data for prediction at a predetermined time interval and transmits the prediction target data for specimen, the factor data for specimen, and the factor data for prediction to the data distribution apparatus 7 or the data management apparatus 3. The data distribution apparatus 7 stores the data received from the data observation apparatus 6 and transmits the data to the data management apparatus 3 or the prediction operation apparatus 2 or both of the apparatuses.

(1-2) Apparatus Internal Configuration

Figure 2:
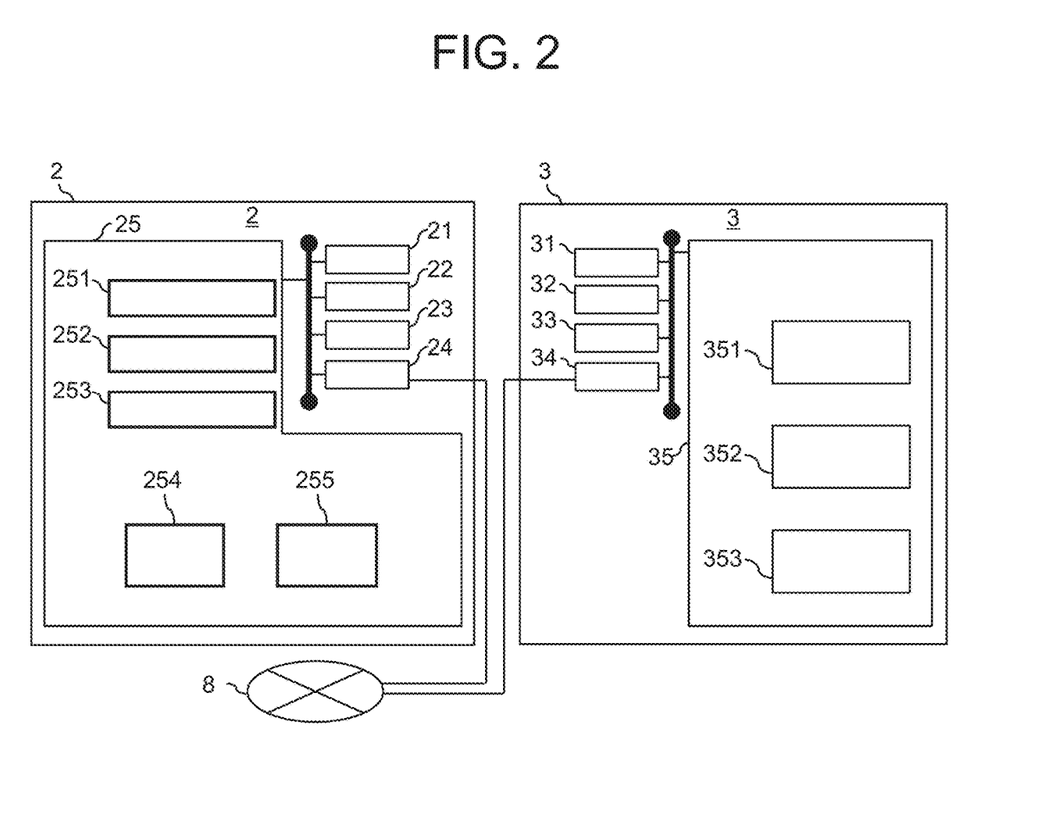
FIG. 2 is a diagram showing a configuration example of a prediction system.

FIG. 2 shows a configuration example of the prediction system 12.

The prediction system 12 comprises the prediction operation apparatus 2 and the data management apparatus 3. Note that the "prediction system" may be a system of another type, for example, a system (for example, a cloud computing system) realized on a physical calculation resource group (for example, the foundation of cloud computing system) instead of a system including physical computers such as the prediction operation apparatus 2 and the data management apparatus 3.

The data management apparatus 3 comprises a CPU (Central Processing Unit) 31 that collectively controls the operation of the data management apparatus 3, an input apparatus 32, an output apparatus 33, a communication apparatus 34, and a storage apparatus 35. The data management apparatus 3 is an information processing apparatus such as a personal computer, a server computer, or a hand-held computer.

The input apparatus 32 comprises a keyboard or a mouse. The output apparatus 33 comprises a display or a printer. The communication apparatus 34 includes a NIC (Network Interface Card) for connection to a wireless LAN or a wired LAN. The storage apparatus 35 is a storage medium such as a RAM (Random Access Memory) or a ROM (Read Only Memory). Output results and intermediate results of processing units may be output as appropriate via the output apparatus 33.

Prediction target data for specimen 351, factor data for specimen 352, and factor data for prediction 353 are stored in the storage apparatus 35.

The prediction target data for specimen 351 is data including observation values at one or a plurality of points in time in the past of a prediction target. Specific examples of the prediction target may be as explained above.

The factor data for specimen 352 is data including observation values at one or a plurality of points in time in the past of various factors that affect an increase or a decrease in a value of the prediction target. Specific examples of the factors may be as explained above. The "observation value" referred to in this paragraph is an example of a factor value for specimen. In the following explanation, the "observation value" is sometimes referred to as "factor value for specimen" as appropriate.

The factor data for prediction 353 is data including input values of factors used in calculation of a prediction value of the prediction target. The "input value" referred to in this paragraph is an example of a factor value for prediction. In the following explanation, the "input value" is sometimes referred to as "factor value for prediction" as appropriate.

The prediction operation apparatus 2 comprises a CPU (Central Processing Unit) 21 that collectively controls the operation of the prediction operation apparatus 2, an input apparatus 22, an output apparatus 23, a communication apparatus 24, and a storage apparatus 25. The prediction operation apparatus 2 is an information processing apparatus such as a personal computer, a server computer, or a hand-held computer.

In the storage apparatus 25, various computer programs for realizing functions such as a factor filter unit 251, a factor selecting unit 252, and a predicting unit 253 are stored. Such various computer programs are executed by the CPU 21, whereby the factor filter unit 251, the factor selecting unit 252, and the predicting unit 253 are realized.

The factor filter unit 251 inputs the prediction target data for specimen 351, the factor data for specimen 352, and the factor data for prediction 353 and outputs a factor data portion for specimen 352A1 and a factor data portion for prediction 353A1, which are portions corresponding to a target factor of factor selection processing in the factor selecting unit 252 in the factor data for specimen 352 and the factor data for prediction 353. Specifically, the factor filter unit 251 determines, using the factor data for specimen 352 and the factor data for prediction 353, about each of a plurality of factors, whether a factor value for prediction is within a specimen range, which is a range of a plurality of factor values for specimen (a plurality of observation values in the past) of the factor. The factor filter unit 251 outputs, as the factor data portion for specimen 352A1 and the factor data portion for prediction 353A1 (see FIG. 5), portions corresponding to a factor, a factor value for prediction of which is within the specimen range, in the factor data for specimen 352 and the factor data for prediction 353.

The factor selecting unit 252 inputs the factor data portion for specimen 352A1 and the factor data portion for prediction 353A1 output by the factor filter unit 251 and the prediction target data for specimen 351, and outputs a factor data portion for specimen 352A2 and a factor data portion for prediction 353A2 used for prediction model identification and prediction value calculation in the predicting unit 253. Specifically, the factor selecting unit 252 selects a factor necessary and sufficient in identification of a prediction model of a prediction target using the factor data portion for specimen 352A1 and the prediction target data for specimen 351. The factor selecting unit 252 outputs, as the factor data portion for specimen 352A2 and the factor data portion for prediction 353A2 (see FIG. 6), portions corresponding to the selected factor in the factor data portion for specimen 352A1 and the factor data portion for prediction 353A1.

The predicting unit 253 input the prediction target data for specimen 351 and the factor data portion for specimen 352A2 and the factor data portion for prediction 353A2 output by the factor selecting unit 252, calculates a prediction value, and adds data including the calculated prediction value to prediction result data 254. Specifically, the predicting unit 253 identifies, using the prediction target data for specimen 351 and the factor data portion for specimen 352A2, a prediction model for calculating a prediction value of a prediction target. The predicting unit 253 inputs the factor data portion for prediction 353A2 to the identified prediction model to calculate a prediction value of the prediction target at a prediction target date and time. The predicting unit 253 adds data including the calculated prediction value to the prediction result data 254.

In the prediction system 12 shown in FIG. 2, the communication apparatuses 24 and 34 are examples of an interface apparatus. The storage apparatuses 25 and 35 are examples of a storage apparatus. The CPUs 21 and 31 are examples of a processor.

(1-3) Processing and a Data Flow of the Entire Prediction System 12

Figure 3:
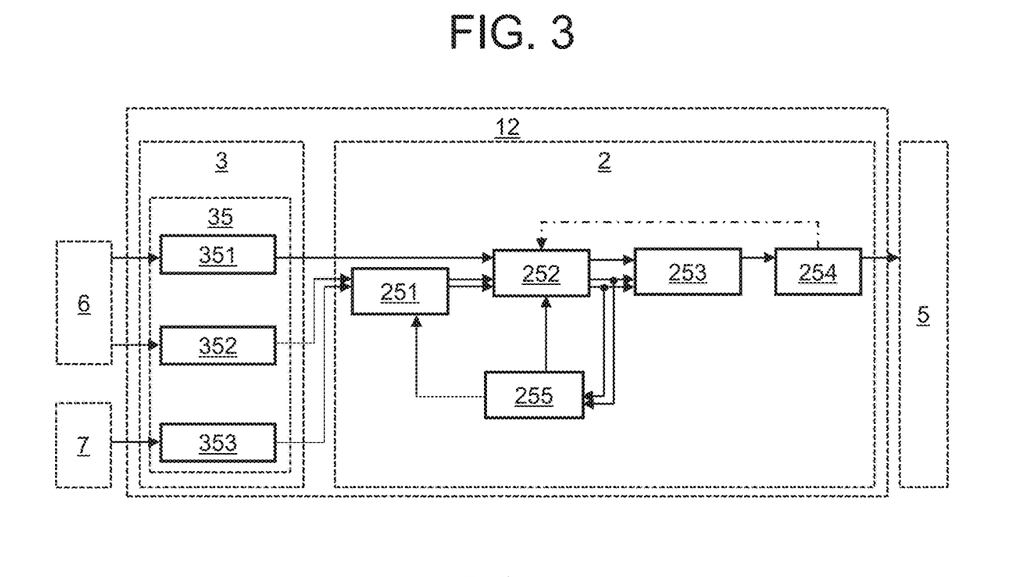
FIG. 3 is a diagram showing an example of a data flow of the prediction system.
Figure 4:
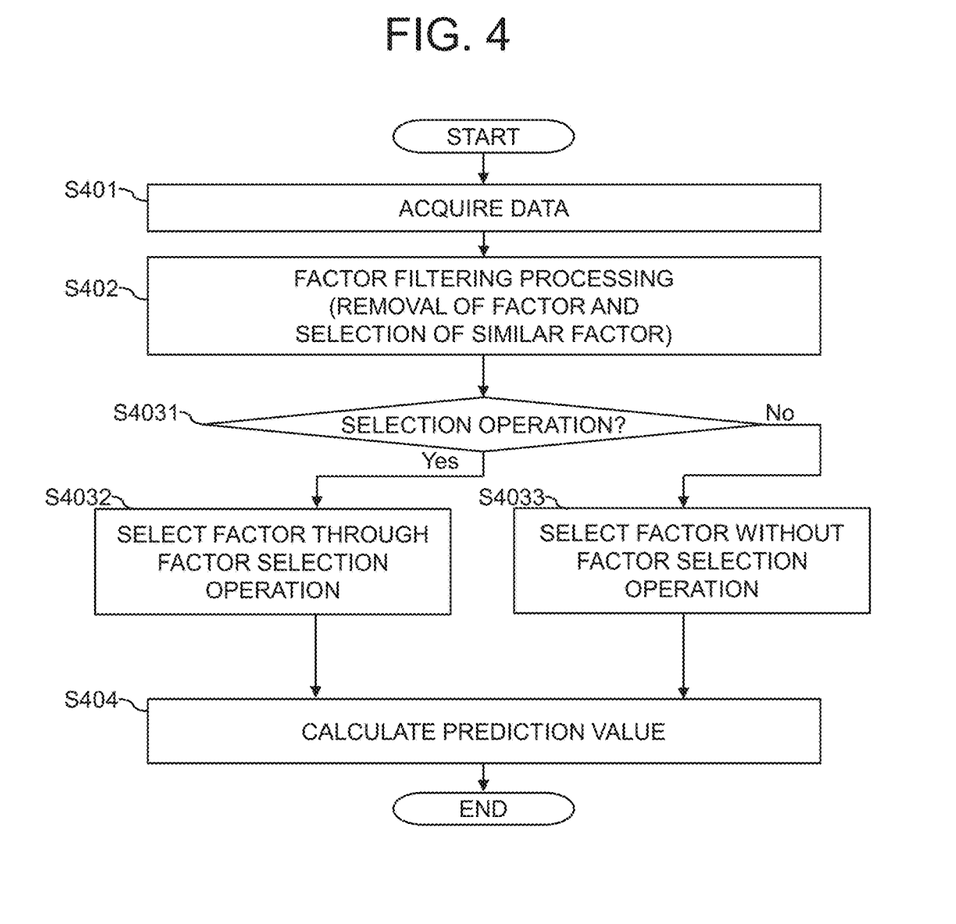
FIG. 4 is a diagram showing an example of a flow of processing performed by the prediction system.

Processing and a data flow of the prediction system 12 are explained with reference to FIG. 3 and FIG. 4.

The data flow of the prediction system 12 is explained with reference to FIG. 3. Note that, in FIG. 3, an alternate long and short dash line arrow relates to a fourth embodiment (recursive processing) explained below.

The data management apparatus 3 receives (acquires) the prediction target data for specimen 351, the factor data for specimen 352, and the factor data for prediction 353 from the data observation apparatus 6 or the data distribution apparatus 7 and stores the data 351, 352, and 353 in the storage apparatus 35.

In the prediction operation apparatus 2, the factor filter unit 251 determines, about the factors in the factor data for specimen 352, whether factor values for prediction in the factor data for prediction 353 are within a specimen range (a range of past values). The factor filter unit 251 outputs the factor data portion for specimen 352A1 and the factor data portion for prediction 353A1 (see FIG. 5) about a factor, a factor value for prediction of which is within the specimen range.

Subsequently, in the prediction operation apparatus 2, the factor selecting unit 252 selects, using the prediction target data for specimen 351 as well as the factor data portion for specimen 352A1 and the factor data portion for prediction 353A1 both output by the factor filter unit 251, a necessary and sufficient factor used in a prediction model identified by the predicting unit 253. The factor selecting unit 252 outputs the factor data portion for specimen 352A2 and the factor data portion for prediction 353A2 (see FIG. 6) of the selected factors in the factor data portion for specimen 352A1 and the factor data portion for prediction 353A1. The factor selecting unit 252 adds data including an identifier for identifying the selected factor to factor selection result data 255. The factor selection result data 255 may include, for example, about the factors, data representing contributions to prediction.

In the prediction operation apparatus 2, the predicting unit 253 identifies a prediction model using the prediction target data for specimen 351 as well as the factor data portion for specimen 352A2 output by the factor selecting unit 252. The predicting unit 253 inputs, to the identified prediction model, the factor data portion for prediction 353A2 output by the factor selecting unit 252 to calculate a prediction value and adds data including the calculated prediction value to the prediction result data 254.

Finally, the prediction operation apparatus 2 transmits the prediction result data 254 including the calculated prediction value to the schedule management apparatus 5 without a request from the schedule management apparatus 5 or in response to a request from the schedule management apparatus 5.

Subsequently, a procedure of processing performed by the prediction system 12 is explained with reference to FIG. 4. This processing may be processing stared when the prediction operation apparatus 2 receives input operation from an apparatus user or when execution time set in advance via the information input/output terminal 4 comes. Processing in step S401 to step S404 is executed by the prediction operation apparatus 2.

First, the factor filter unit 251 acquires and receives the prediction target data for specimen 351, the factor data for specimen 352, and the factor data for prediction 353, all from the data management apparatus 3 (S401).

Subsequently, the factor filter unit 251 performs factor filtering processing (S402). The factor filtering processing includes selecting, about factors, based on a factor value for prediction in the factor data for prediction 353 and a specimen range specified from the factor data for specimen 352, factors for which factor selection processing is performed in the factor selecting unit 252; and outputting the factor data portion for specimen 352A1 and the factor data portion for prediction 353A1 of the selected factors. The factors selected in the factor filtering processing may be all factors other than factors excluded because prediction values for factor thereof are not within the specimen range (that is, all factors, prediction values for factor of which are within the specimen range). However, in this embodiment, factors similar to the excluded factors among factors remaining without being excluded are preferentially included in the factors selected in the factor filtering processing. The "similar factors" are factors having an absolutely or relatively strong correlation with the excluded factors. "Having an absolutely strong correlation" may be that a correlation coefficient is a fixed value or more. "Having a relatively strong correlation" may be that a correlation coefficient is relatively strong (for example, strongest) in a factor other than the excluded factors. "Having an absolutely or relatively strong correlation" may include having similar contribution to prediction. "Having similar contribution" may mean that a difference between contributions is a fixed value or less.

The factor selecting unit 252 determines, using the prediction target data for specimen 351 as well as the factor data portion for specimen 352A1 and the factor data portion for prediction 353A1 both output by the factor filter unit 251, whether to perform a factor selection operation (S4031).

When a determination result in S4031 is true, the factor selecting unit 252 selects, through the factor selection operation, a factor used in a prediction model to be identified in the predicting unit 253 and outputs the factor data portion for specimen 352A2 and the factor data portion for prediction 353A2 corresponding to the selected factor (S4032).

When the determination result in S4031 is false, the factor selecting unit 252 selects, not through the factor selection operation, a factor used in the prediction model to be identified in the predicting unit 253 (in other words, selects the same factor as a selection result of a factor in the past) and outputs the factor data portion for specimen 352A2 and the factor data portion for prediction 353A2 corresponding to the selected factor (S4033).

The predicting unit 253 identifies a prediction model using the prediction target data for specimen 351 as well as the factor data portion for specimen 352A2 output by the factor selecting unit 252, inputs, to the identified prediction model, the factor data portion for prediction 353A2 output by the factor selecting unit 252, and outputs a prediction value of a prediction target (S404).

Finally, the prediction operation apparatus 2 transmits the prediction result data 254 including the prediction value output by the predicting unit 253 to the schedule management apparatus 5 without a request from the schedule management apparatus 5 or in response to a request from the schedule management apparatus 5.

Figure 5:
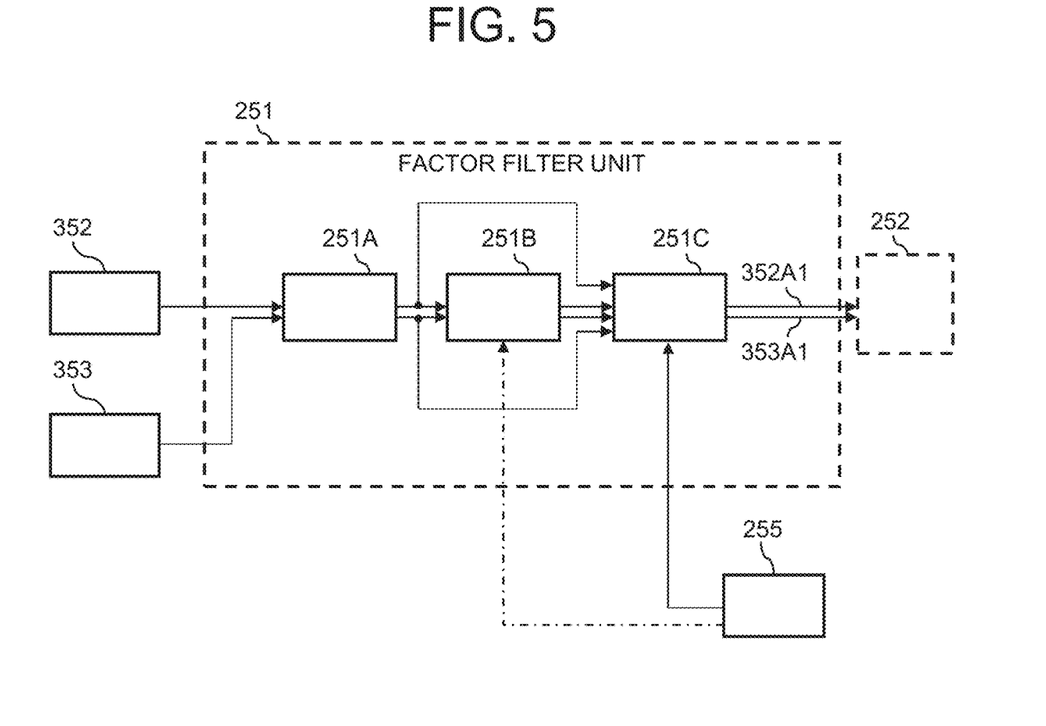
FIG. 5 is a diagram showing an example of a data flow of factor filtering processing.

Details of the components are explained with reference to FIG. 5 to FIG. 7.

(1-4) Details of the Components (1-4-1) Factor Filter Unit 251

A data flow and processing of the factor filter unit 251 are explained with reference to FIG. 5. Note that, in FIG. 5, an alternate long and short dash line arrow relates to a sixth embodiment (a weighted average of a result of factor selection performed in the past) explained below.

The factor filter unit 251 performs factor filtering processing. The factor filtering processing includes (a) and (b) described below.

(a) Determining, about factors before the factor selection processing is performed, whether a factor value for prediction in the factor data for prediction 353 is within a specimen range specified from the factor data for specimen 352 (a range of a plurality of factor values for specimen used to identify a prediction model).

(b) Excluding a factor, a result of the determination of which is false, and outputting the factor data portion for specimen 352A2 and the factor data portion for prediction 353A1 about a factor not excluded.

One or a plurality of factor values for specimen are added anew for at least one factor to the factor data for specimen 352 at any time or periodically. When it is necessary to identify a prediction model, the factor filter unit 251 acquires a plurality of factor values for specimen of the factor to identify a prediction model. The range of the plurality of factor values for specimen is a specimen range. The factor filter unit 251 excludes a factor, a factor value for prediction of which is not within the specimen range. Consequently, it is possible to reduce a prediction error due to a factor having time dependency on the specimen range.

The factor filtering processing is performed before the factor selection processing by the factor selecting unit 252. There is known a technical problem in that, depending on an algorithm of the factor selection operation in the factor selection processing, accuracy of factor selection could be deteriorated if the number of factors serving as choices is large. The factor filtering processing may be performed after the factor selection processing. However, in this embodiment, the factor filtering processing is performed before the factor selection processing. Consequently, it is possible to reduce possibility that accuracy of factor selection is deteriorated.

Specifically, the factor filter unit 251 includes a range filter unit 251A, a correlation filter unit 251B, and a filter-result adjusting unit 251C.

The range filter unit 251A acquires the factor data for specimen 352 and the factor data for prediction 353 from the data management apparatus 3. Subsequently, the range filter unit 251A determines, about respective factors, whether factor values for prediction in the factor data for prediction 353 are within a specimen range specified from the factor data for specimen 352. For example, about a certain factor A, if a factor value for prediction is "10" and a minimum value and a maximum value of a factor value for specimen are respectively "0" and "20", the range filter unit 251A determines that the factor value for prediction of the factor A is within the specimen range. Note that the specimen range is not limited to a range of a minimum value to a maximum value among a plurality of factor values for specimen and may be a range of another type of the plurality of factor values for specimen, a range obtained by multiplying the plurality of factor values for specimen by a preset multiplier, or a range obtained by adding a preset value to or subtracting a preset value from the plurality of factor values for specimen. The range filter unit 251A performs determination processing about all the factors. The range filter unit 251A performs one of (X) and (Y) described below.

(X) Outputting a factor data portion for specimen and a factor data portion for prediction only about a factor, a factor value for prediction of which is determined as being within the specimen range.

(Y) Outputting (y1) and (y2) described below.

(y1) A factor data portion for specimen and a factor data portion for prediction correlated with information representing a factor, a factor value for prediction of which is determined as being within the specimen range.

(y2) A factor data portion for specimen and a factor data portion for prediction correlated with information representing a factor, a factor value for prediction of which is determined as not being within the specimen range (that is, an exclusion target factor).

The correlation filter unit 251B performs processing of at least one of (A) and (B) described below.

(A) When (X) described above is performed by the range filter unit 251A, the correlation filter unit 251B calculates a correlation between the factors (a correlation among a factor value group for specimen (a plurality of factor values for specimen) between the factors) from the factor data portion for specimen output by the range filter unit 251A. The correlation filter unit 251B outputs a factor data portion for specimen and a factor data portion for prediction of only one factor among factors having correlation values (correlation coefficients) exceeding a predetermined threshold. Note that processing performed by the correlation filter unit 251B is not limited to this. Processing of another type, for example, publicly-known processing for excluding multicollinearity, may be applied.

(B) When (Y) described above is performed by the range filter unit 251A, the correlation filter unit 251B specifies, based on (y1) and (y2), a factor similar to the exclusion target factor (a factor having an absolutely or relatively strong correlation with the exclusion target factor) and outputs a factor data portion for specimen and a factor data portion for prediction of the specified similar factor. When a plurality of similar factors are found, the correlation filter unit 251B narrows down the plurality of similar factors into one similar factor with the same method as the processing of (A) and outputs a factor data portion for specimen and a factor data portion for prediction of the narrowed-down similar factor.

Finally, the filter-result adjusting unit 251C refers to contributions to prediction of the factors recorded in the factor selection result data 255. Consequently, from the factor selection result data 255, contributions of the factors can be seen about the factor data portion for specimen and the factor data portion for prediction output by the correlation filter unit 251B. The filter-result adjusting unit 251C determines whether a factor value of a factor indicating contribution exceeding a predetermined threshold is included in the factor data portion for specimen and the factor data portion for prediction output by the correlation filter unit 251B.

When a result of the determination is true, the filter-result adjusting unit 251C outputs the factor data portion for specimen and the factor data portion for prediction both output by the correlation filter unit 251B.

On the other hand, when the result of the determination is false, the filter-result adjusting unit 251C acquires a factor data portion for specimen and a factor data portion for prediction of the factor, the contribution of which exceeds the threshold, from the factor data portion for specimen and the factor data portion for prediction both output by the range filter unit 251A. The filter-result adjusting unit 251C outputs, as the factor data portion for specimen 352A1, data including the acquired factor data portion for specimen and the factor data portion for specimen output by the correlation filter unit 251B. The filter-result adjusting unit 251C outputs, as the factor data portion for prediction 353A1, data including the acquired factor data portion for prediction and the factor data portion for prediction output by the correlation filter unit 251B.

With the factor filter unit 251, among the factors, the factor values for prediction of which are within the specimen range, the factor similar to the factor to be excluded, the factor value for prediction of which is not within the specimen range, is preferentially set as an output target. Consequently, for example, when contribution of the excluded factor exceeds the threshold, it is expected that a prediction value is calculated using a factor value for prediction of the factor similar to the factor. As a result, a further reduction of a prediction error can be expected.

With the factor filter unit 251, when a correlation among factors is high, one factor is selected among from the factors. Consequently, the number of factors servings as choices of the factor selection processing is reduced. Accordingly, it can be expected to reduce the influence of the technical problem in that, depending on an algorithm of a factor selection operation, accuracy of factor selection could be deteriorated if the number of factors serving as choices is large.

With the factor filter unit 251, when the factor, the contribution of which exceeds the threshold, disappears as a result of narrowing down the factors, a factor, contribution of which exceeds the threshold, among factors excluded in the narrow-down, is returned. Consequently, a further reduction in a prediction error can be expected.

The above is the detailed explanation of the factor filter unit 251.

(1-4-2) Factor Selecting Unit 252

A data flow and processing of the factor selecting unit 252 are explained with reference to FIG. 6. Note that, in FIG. 6, an alternate long and short dash line arrow relates to a seventh embodiment (reducing execution frequency of a factor selection operation according to the magnitude of a prediction error) explained below.

The factor selecting unit 252 performs factor selection processing. The factor selection processing includes (a) and (b) described below.

(a) Selecting, using the prediction target data for specimen 351 as well as the factor data portion for specimen 352A1 and the factor data portion for prediction 353A1 both output by the factor filter unit 251, a factor used in a prediction model to be identified in the predicting unit 253.

(b) Outputting the factor data portion for specimen 352A2 and the factor data portion for prediction 353A2 of the selected factor.

Specifically, the factor selecting unit 252 includes a factor-selection-necessity determining unit 252A and a factor selection operation unit 252B.

The factor-selection-necessity determining unit 252A determines, based on the factor data portion for specimen 352A1 and the factor data portion for prediction 353A1 both output by the factor filter unit 251, whether it is necessary to perform the factor selection operation anew in the factor selection operation unit 252B, and outputs a control value indicating a result of the determination (necessity of execution of the factor selection operation). Consequently, since an execution frequency of the factor selection operation decreases, a reduction in a processing load can be expected in addition to a reduction in a prediction error. For example, the factor-selection-necessity determining unit 252A calculates an amount of change (a difference) of an information amount due to addition of the factor data portion for prediction 353A1 to the factor data portion for specimen 352A1. When the calculated amount of change exceeds a predetermined threshold, the factor-selection-necessity determining unit 252A outputs a control value indicating that a new factor selection operation is necessary. On the other hand, when the calculated difference is equal to or smaller than the predetermined threshold, the factor-selection-necessity determining unit 252A outputs a control value indicating that a new factor selection operation is unnecessary. In this way, the execution frequency of the factor selection operation is appropriately reduced.

Subsequently, when the control value output from the factor-selection-necessity determining unit 252A represents that the factor selection operation is necessary, the factor selection operation unit 252B performs, using the prediction target data for specimen 351 as well as the factor data portion for specimen 352A1 output by the factor filter unit 251, a factor selection operation for selecting a factor used in a prediction model to be identified by the predicting unit 253. The factor selection operation unit 252B outputs, as the factor data portion for specimen 352A2 and the factor data portion for prediction 353A2, portions corresponding to the selected factor in the factor data portion for specimen 352A1 and the factor data portion for prediction 353A1. Note that the selection operation may be processing generally called characteristic selection or variable selection and may be an operation to which a publicly-known method is applied. The publicly-known method may be a filter method based on a correlation with a prediction target, a forward method, a backward method, a wrapper method such as combination optimization application, ridge regression, lasso regression, regularization such as an elastic net, a method using an ensemble tree such as a random forest or a gradient boosting tree, or the like.

When the control value output from the factor-selection-necessity determining unit 252A represents that the factor selection operation is unnecessary, the factor selection operation unit 252B selects a factor without the factor selection operation. For example, the factor selection operation unit 252B outputs, as the factor data portion for specimen 352A2 and the factor data portion for prediction 353A2, portions corresponding to the factor recorded in the factor selection result data 255 in the factor data portion for specimen 352A1 and the factor data portion for prediction 353A1.

Note that the factor selection operation unit 252B can calculate, about selected factors, contributions to prediction and add data representing the selected factors and the calculated contributions to the factor selection result data 255.

The above is detailed explanation of the factor selecting unit 252.

(1-4-3) Predicting Unit 253

A data flow and processing of the predicting unit 253 are explained with reference to FIG. 7. Note that, in FIG. 7, an alternate long and short dash line arrow relates to a ninth embodiment (prediction considering contribution of a factor) explained below.

The predicting unit 253 performs prediction processing. The prediction processing includes (a) to (c) described below.

(a) Identifying, using the prediction target data for specimen 351 as well as the factor data portion for specimen 352A2 output by the factor selecting unit 252, a prediction model for calculating a prediction value of a prediction target.

(b) Inputting the factor data portion for prediction 353A2 to the identified prediction model to calculate a prediction value of the prediction target.

(c) Adding data including the calculated prediction value to the prediction result data 254.

Specifically, the predicting unit 253 includes a prediction-model identifying unit 253A and a prediction-value calculating unit 253B.

The prediction-model identifying unit 253A acquires the prediction target data for specimen 351 from the data management apparatus 3 and receives the factor data portion for specimen 352A2 and the factor data portion for prediction 353A2 from the factor selecting unit 252. Subsequently, the prediction-model identifying unit 253A identifies, using the prediction target data for specimen 351 and the factor data portion for specimen 352A2, a prediction model for calculating a prediction value of a prediction target. The prediction model may be a publicly-known model. The publicly-known model may be, for example, any one of the following.

A linear model such as ridge regression, lasso regression, or an elastic net.

A tree model such as a regression tree, a random forest, or a boosting tree.

A kernel method such as support vector regression, kernel ridge regression, or Gaussian process regression.

A neural network such as a recurrent network or a Long Short-Term Memory.

The prediction-value calculating unit 253B inputs the factor data portion for prediction 353A1 output by the factor selecting unit 252 to the prediction model identified (output) by the prediction-model identifying unit 253A to calculate a prediction value of the prediction target, and adds data including the calculated prediction value to the prediction result data 254.

The above is detailed explanation of the predicting unit 253.

(1-5) Explanation of Effects of the Present Invention

Subsequently, an example of effects of the prediction system 12 is explained with reference to FIG. 8A and FIG. 8B.

Figure 8A:
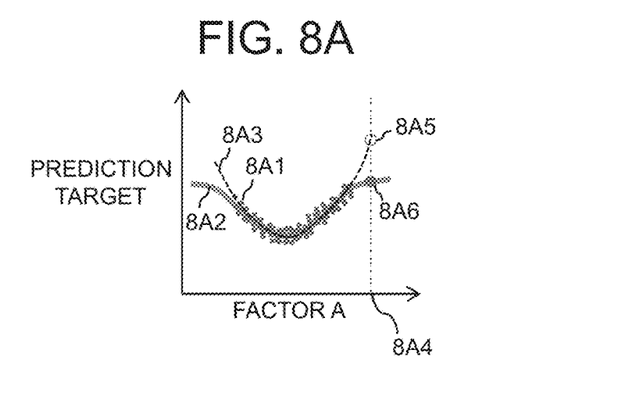
FIG. 8A is a diagram showing an example of a relation between a specimen range about a factor to be excluded and a factor value for prediction.
Figure 8B:
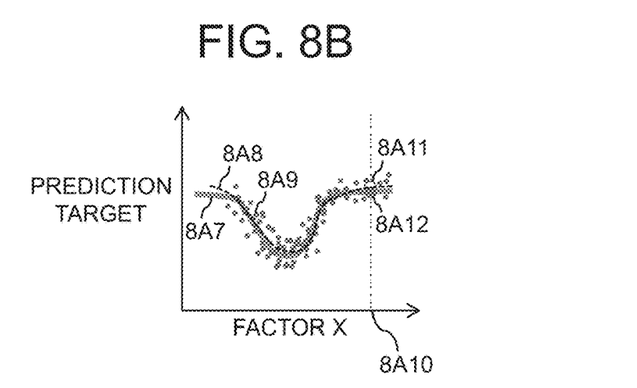
FIG. 8B is a diagram showing an example of a relation between a specimen range about a factor similar to the factor to be excluded and a factor value for prediction.

FIG. 8A illustrates a case in which a plurality of factor values for specimen of a factor A are used in identifying a prediction model for calculating a prediction value of a prediction target. Typically, a multidimensional prediction model using a plurality of factor values for specimen of a plurality of factors is identified. However, for simplification of the figure, an example is adopted in which a plurality of factor values for specimen of only the factor A are used to identify a prediction model.

A point 8A1 is a specimen point plotted in a coordinate corresponding to a factor value for specimen and a prediction value for specimen (a value in the prediction target data for specimen 351) corresponding to the factor value for specimen. A prediction model identified using a plurality of specimen points 8A1 is a broken curved line 8A3. When a factor value for prediction 8A4 present outside a specimen range (in FIG. 8A, a range of a minimum value to a maximum value of factor values for specimen of the plurality of specimen points 8A1) is input to the prediction model 8A3, a prediction value 8A5 is output.

However, when a true prediction model of a factor value of the factor A and a value of a prediction target is a thick line 8A2, an actual value observed afterward as a value corresponding to the factor value for prediction 8A4 about the prediction target is a value 8A6 and is a value significantly smaller than the prediction value 8A5.

Therefore, when the prediction model 8A3 is identified using the plurality of factor values for specimen of the factor A, since the factor value for prediction 8A4 of the factor A is outside the specimen range, reliability of the identified prediction model 8A3 is low. As a result, a large prediction error occurs.

Therefore, the factor filtering processing by the factor filter unit 251 in this embodiment is performed. Consequently, the factor A is excluded, that is, not used to identify a prediction model. In this case, in the factor filtering processing, among factors, factor values for prediction of which are within the specimen range, at least a factor X, which is an example of a factor having a strong correlation with the factor A (for example, having contribution similar to contribution of the factor A), is selected. A prediction model (a curve) 8A8 is identified using a plurality of specimen points 8A9 of the factor X. The prediction model 8A8 is similar to a true prediction model (a thick line) 8A7 in a specimen range. A factor value for prediction 8A10 of the factor X is within the specimen range. Therefore, reliability of the prediction model 8A8 is relatively high. A prediction value 8A11 obtained by inputting the factor value for prediction 8A10 to the prediction model 8A8 is a value close to an actual value 8A12 observed afterward. That is, a prediction error is small.

As explained above, in this embodiment, it is possible to reduce occurrence of an excessively large error of a prediction due to a factor value for prediction being outside a specimen range.

(2) Second Embodiment

In the first embodiment, the factor data for specimen 352 and the factor data for prediction 353 are acquired from at least one of the data distribution apparatus 7 and the data observation apparatus 6. However, in this embodiment, at least a part of the factor data for specimen 352 and the factor data for prediction 353 is input and set in advance via the information input/output terminal 4.

Specifically, for example, in the factor data for specimen 352 collected from at least one of the data distribution apparatus 7 and the data observation apparatus 6 about a certain factor A, it is assumed that upper and lower limit values of factor values for specimen are "8" and "0" (that is, a specimen range is a range of 0 or more to 8 or less). At this time, it is assumed that prediction values for specimen for the respective upper and lower limit values are "10" and "1". When a factor value for prediction is "9", since the factor value for prediction is outside the specimen range, the factor A is excluded in the factor filter unit 251.

It is assumed that a relation between a factor value and a prediction value of the factor A is evident in principle and, therefore, for example, it is evident that the prediction value is "15" with respect to the factor value "10" outside the specimen range. In this case, an operation administrator (an example of a user) adds a factor value for specimen "10" to the factor data for specimen 352 and adds the prediction value "15" corresponding to the factor value for specimen "10" to the prediction target data for specimen 351, whereby the specimen range changes from 0 or more to 8 or less to 0 or more to 10 or less. Therefore, even if the factor value for prediction is "9" described above, the exclusion of the factor A is avoided.

Consequently, in a scene in which a relation between a factor value and a prediction value is evident in principle and specimen points of the factor value and the prediction value (a pair of a factor value for specimen and a prediction value for specimen) are not observed yet, by defining specimen points of upper and lower limits evident in principle beforehand, it is possible to avoid a factor having high contribution being excluded due to a factor value for prediction being outside a specimen range and, therefore, avoid deterioration in reliability of a prediction model to be identified.

(3) Third Embodiment

In the first embodiment, the correlation filter unit 251B excludes one of the factors having a strong correlation with each other. However, in a third embodiment, in some cases, the processing of the correlation filter unit 251B is skipped and, as a result, all outputs of the range filter unit 251A are input to the filter-result adjusting unit 251C. For example, when the number of factors excluded by the range filter unit 251A is small and, therefore, the number of factors having passed through the range filter unit 251A is equal to or larger than a fixed value, the processing of the correlation filter unit 251B may be skipped.

Consequently, when there are factors that, although having a strong correlation with each other, are excluded because of a slight difference of values but greatly contribute to a prediction model (that is, having high contribution), exclusion of the factors is avoided. Therefore, it is possible to improve final prediction accuracy.

(4) Fourth Embodiment

In the first embodiment, the flow of the processing from the factor filtering processing, then the factor selection processing, and until reaching the prediction processing is performed only once. However, in this embodiment, a prediction value output by the predicting unit 253 is added as a new factor value for prediction and the processing from the factor filtering processing to the prediction processing is recursively performed. At this time, a prediction value in the past stored in the prediction target data for specimen 351 or the prediction result data 254 is added as a new factor value for specimen corresponding to the new factor value for prediction.

As explained above, in this embodiment, in the factor filtering processing, a prediction target is included as a factor, a factor value for prediction, as for the prediction target serving as the factor, is a prediction value calculated, and a plurality of factor values for specimen are a plurality of values obtained in the past about the prediction target. Consequently, when a prediction target is a plurality of values and the values have a correlation among themselves, it is possible to output a prediction value reflecting a correlation among prediction values by performing a recursive prediction, and it is possible to improve prediction accuracy. More specifically, a prediction error is reduced because a factor, a factor value for prediction of which is outside a specimen range, is excluded from factors used for a prediction. Therefore, accuracy of a prediction value is high, and it is possible to improve prediction accuracy by adding a prediction target as a factor and performing recursive processing using a prediction value as a factor for prediction.

(5) Fifth Embodiment

In the first embodiment, the factor selection operation is an operation with a publicly-known method. However, in this embodiment, the factor selection operation is a factor selection operation using a prediction model used in the predicting unit 253.

Specifically, first, the factor selection operation unit 252B calculates contributions (contributions to a prediction) of factors using a publicly-known method. Subsequently, the factor selection operation unit 252B identifies a plurality of prediction models using the factors in the order depending on whether their contributions are larger or smaller. The factor selection operation unit 252B calculates prediction accuracies of the respective prediction models (an example of evaluation values of the prediction models), selects a factor used in a prediction model having the best prediction accuracy, and outputs the factor data portion for specimen 352A2 and the factor data portion for prediction 353A2 corresponding to the selected factor.

A factor selected by mistake is sometimes included in a factor selection result calculated in the factor selection operation unit 252B. By inspecting the factor selection result obtained in the factor selection operation unit 252B using a prediction model to be used in the predicting unit 253, it is possible to select only a factor having the prediction model with the best prediction accuracy. Therefore, it is possible to improve prediction accuracy.

(6) Sixth Embodiment

In the first embodiment, the factor selecting unit 252 updates the factor selection result data 255 every time or uses again a result of the factor selection processing performed in the past. However, in this embodiment, the factor selecting unit 252 performs weighted averaging of a result of factor selection performed in the past.

Figure 6:
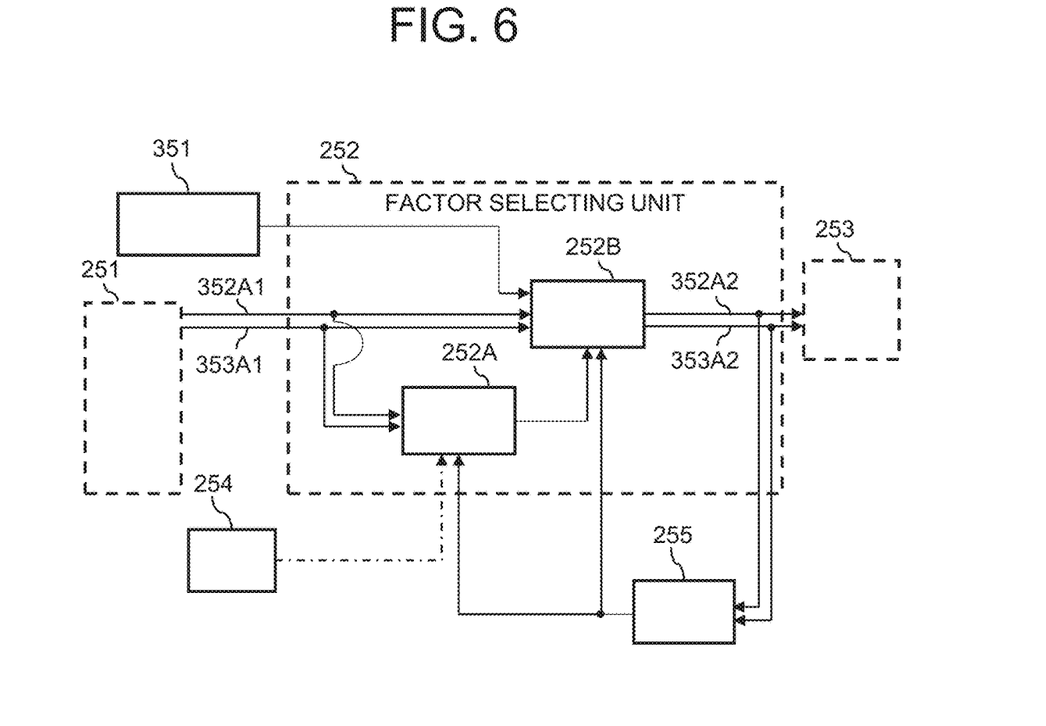
FIG. 6 is a diagram showing an example of a data flow of factor selection processing.
Figure 7:
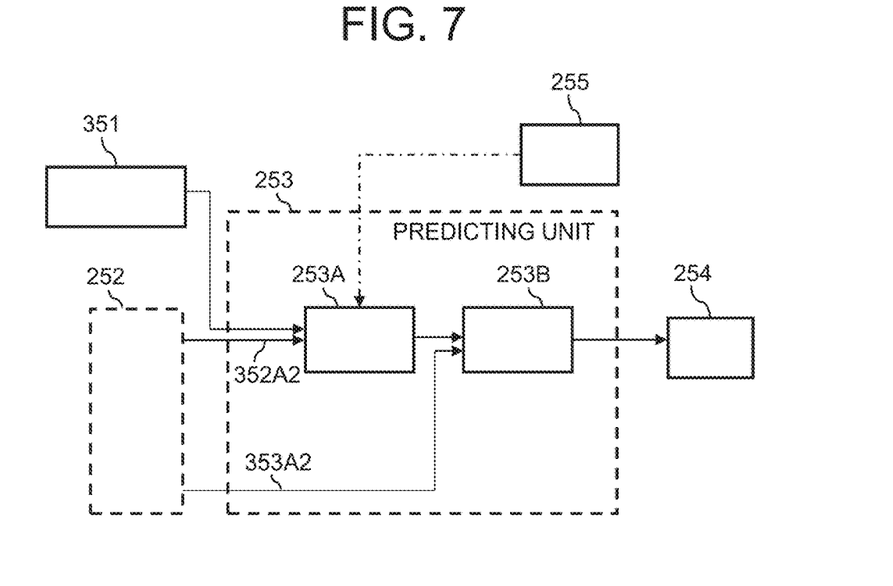
FIG. 7 is a diagram showing an example of a data flow of prediction processing.

Specifically, first, in addition to selecting factors used in a prediction model to be identified in the predicting unit 253, using the prediction target data for specimen 351 and the factor data portion for specimen 352A1, the factor selection operation unit 252B shown in FIG. 6 calculates contributions of the factors to the prediction model. Subsequently, the factor selection operation unit 252B acquires all contributions (contributions to a prediction model of factors obtained in the factor selection processing carried out in the past) stored in the factor selection result data 255. The factor selection operation unit 252B averages the calculated and acquired contributions of the factors. The averaging may be simple arithmetic averaging or may be weighted averaging based on dates and times when indicator values indicating the respective contributions are calculated. The factor selection operation unit 252B performs, using the calculated contributions of the factors, with cross validation, selection of a factor used to identify a prediction model.

As explained above, the factor selection processing includes, about the factors, averaging contribution to a prediction model identified based on a plurality of factor values for specimen and a plurality of contributions respectively corresponding to a plurality of points in time in the past. The factor selection operation is an operation for selecting a factor based on averaged contribution about the factors. Contribution of a factor can change over time. According to this embodiment, it is possible to perform factor selection following a change over time of a factor having high contribution to a prediction model. Therefore, possibility of erroneous selection of a factor is reduced. As a result, it is possible to improve prediction accuracy.

(7) Seventh Embodiment

In the first embodiment, the amount of change of the information amount is adopted as a reference of the necessity determination for the factor selection operation. However, in this embodiment, a prediction error is adopted instead of or in addition to the amount of change of the information amount. Specifically, the factor-selection-necessity determining unit 252A acquires the prediction result data 254 and determines whether a value conforming to a prediction error specified based on the prediction result data 254 (for example, a certain single prediction error or an average or an accumulation of prediction errors from a predetermined past period) exceeds a predetermined threshold. When a result of the determination is true (alternatively, when the amount of change of the information amount also exceeds a threshold), a control value indicating that the factor selection operation is necessary is output. When the result of the determination is false (alternatively, when the amount of change of the information amount is also equal to or smaller than the threshold), a control value indicating that the factor selection operation is unnecessary is output.

Consequently, it is possible to detect a prediction error expansion with a change over time and cause a factor to be selected for use in a prediction model to follow the change over time. Therefore, it is possible to maintain prediction accuracy.

(8) Eighth Embodiment

Figure 9:
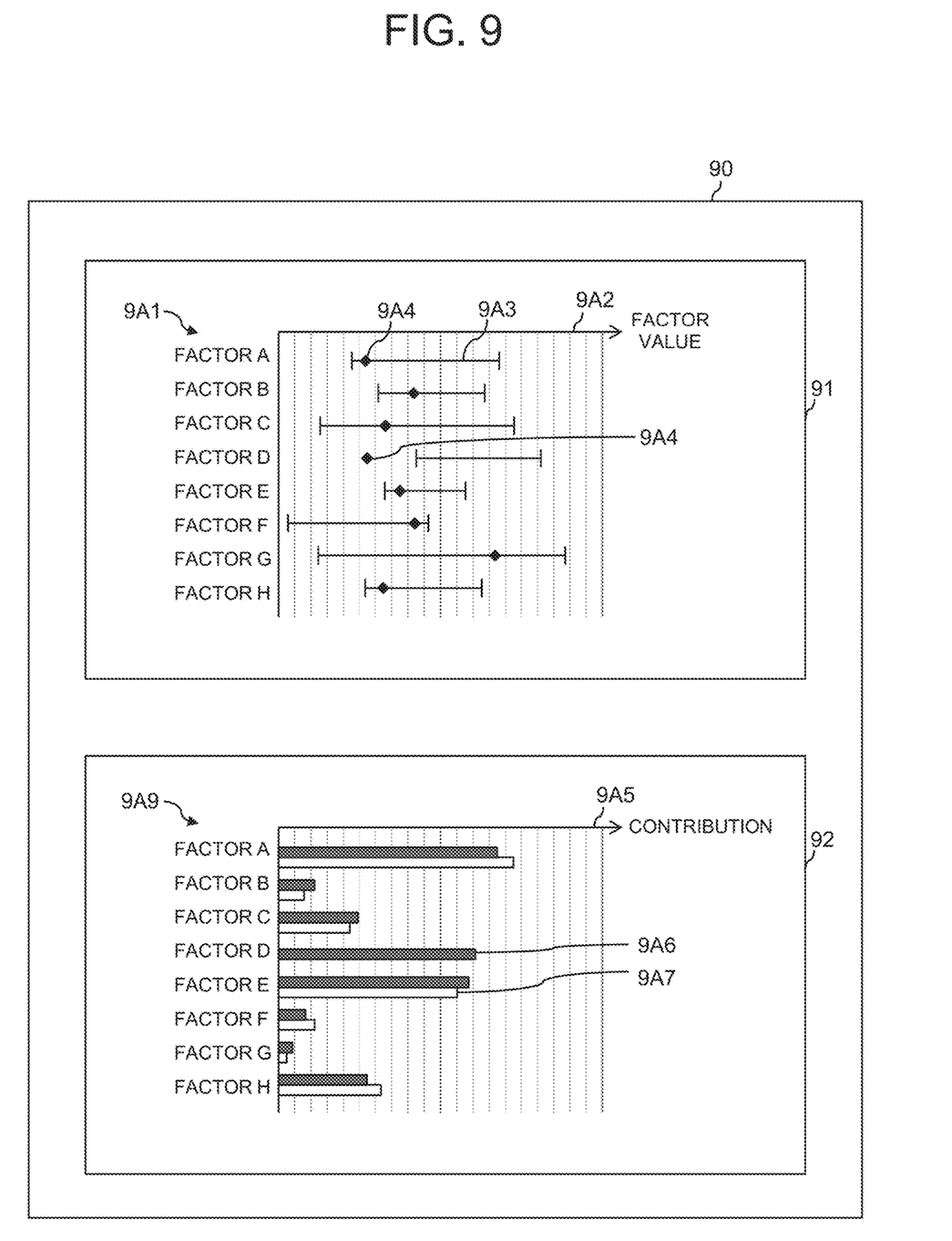
FIG. 9 is a diagram showing an example of a result display screen displayed by the prediction system.

In the first embodiment, the factor selecting unit 252 stores the factor selection result in the factor selection result data 255. In this embodiment, the factor selecting unit 252 visualizes the factor selection result data 255. For example, the factor selecting unit 252 displays a result based on the factor selection result data 255 on a result display screen of the information input/output terminal 4. This is specifically explained with reference to FIG. 9. FIG. 9 shows an example of the result display screen.

At least one of a first graph 91 and a second graph 92 is displayed on a result display screen 90.

The first graph 91 is a graph representing a relation between a specimen range and a factor value for prediction about each factor. In the first graph 91, a vertical axis 9A1 is an axis of a factor. On the vertical axis 9A1, identifiers (for example, names) of all factors specified from the factor data for specimen 352 and the factor data for prediction 353 are displayed. A horizontal axis 9A2 is an axis of a factor value. Factor values are displayed on the horizontal axis 9A2. Note that, here, a factor value of each factor is normalized and displayed. About each factor (for example, a factor A), a reference sign 9A3 indicates an object representing a specimen range. About each factor (for example, the factor A or a factor D), a rhombus point 9A4 is an object representing a factor value for prediction of the factor.

According to the first graph 91 illustrated in FIG. 9, a factor value for prediction of the factor D is present outside a specimen range of the factor D. Accordingly, the factor D is excluded from selection target factors in the factor filter unit 251.

The second graph 92 is a graph representing, about each factor, contributions of at least one factor to prediction before and after exclusion. In the second graph 92, a vertical axis 9A9 is an axis of a factor like the vertical axis 9A1. A horizontal axis 9A5 is an axis of contribution. Contribution to a prediction model of each factor is displayed on the horizontal axis 9A5. In the second graph 92, two types of bars are displayed about each factor. About each factor, an upper bar represents contribution of the factor in the case in which the factor selection processing is carried out targeting all the factors without performing the factor filtering processing. About each factor, a lower bar represents contribution of the factor in the case in which the factor selection processing is performed with applying the factor filtering processing. About each factor, the contribution is a relative value and, therefore, when at least one factor is excluded, contributions of the remaining factors change.

When the factor filtering processing is not performed, according to a bar 9A6, the factor D is a factor having high contribution. However, since the factor D is excluded from targets of the factor selection processing as indicated by the first graph 91, when the factor filtering processing is performed, contribution of the factor D is zero as indicated by a bar 9A7. Therefore, in the predicting unit 253, the factor D is not used to identify a prediction model.

As explained above, the result display screen is displayed based on the factor selection result data 255. In the factor selection result data 255, besides contribution for each of the factors selected after the factor filtering processing, contribution of each factor before the factor filtering processing (contribution calculated by the factor selecting unit 252), and a specimen range and a factor value for prediction specified from factor data for specimen and factor data for prediction of each factors are recorded. Based on such factor selection result data 255, about each factor, at least one of a relation between the specimen range and the factor value for prediction and the contributions before and after the factor filtering processing is displayed. Consequently, it is possible to clarify a ground for use of a factor used in a prediction model identified in the predicting unit 253, and it is possible to improve convenience of the prediction system in this embodiment.

(9) Ninth Embodiment

In the first embodiment, a prediction model is identified by a publicly-known method. However, in this embodiment, the predicting unit 253 identifies a prediction model based on contribution to the prediction model of each factor output by the factor selecting unit 252.

Specifically, for example, when factors to be used are two types, that is, a factor x1 and a factor x2, and a prediction model is a linear regression model such as a multivariate regression model or an autoregression model, the prediction model may be represented by, for example, the following expression.

$$Y = a*x1*w1 + b*x2*w2 + c$$

Here, Y is a prediction value. Each of a, b, and c is a parameter of the regression model. * means multiplication. Each of w1 and w2 is contribution of each factor output by the factor selecting unit 252. For example, when w2 is larger than w1, this means that the factor x2 has higher contribution than the factor x1.

When the prediction model is a prediction model based on similarity between pieces of data such as in the kernel method and the similarity is calculated based on a Euclidean distance, similarity S is given by, for example, the following expression.

$$S = d\_ij \sim w1(x1\_i - x1\_j)^2 + w2(x2\_i - x2\_j)^2$$

Here, d_ij is a Euclidean distance between i-th and j-th specimens. ~ means proportion. Each of w1 and w2 is contribution.

As explained above, the prediction processing includes: adjusting, based on contribution to prediction about each factor, a matching degree of the factor to a prediction model to be identified; and inputting a factor value for prediction to the prediction model based on the matching degree after the adjustment about each factor. Consequently, it is possible to more strongly match the prediction model to a factor having higher contribution to the prediction model among factors selected by the factor selecting unit 252, and it is possible to improve prediction accuracy.

Several embodiments of the present invention are explained above. However, the embodiments are mere illustrations for the explanation of the present invention and do not mean to limit the scope of the present invention to these embodiments. The present invention can also be carried out in various other forms. For example, any two or more embodiments among the plurality of embodiments explained above can be combined with each other.

REFERENCE SIGNS LIST

1 data management system, 2 prediction operation apparatus, 3 data management apparatus, 4 information input/output terminal, 5 schedule management apparatus, 6 data observation apparatus, 7 data distribution apparatus, 8 communication path, 12 prediction system

The invention claimed is:
1. A prediction system comprising:
a central processing unit (CPU);
a second CPU coupled to the first CPU; and
a plurality of generators generating electric power,
wherein the first CPU is programmed to execute:
a factor selecting unit that performs factor selection processing including performing a factor selection operation, which is an operation for selecting one or two or more factors from one or a plurality of factors based on averaged contribution about each of the one or the plurality of factors, and the factor selection processing including averaging, about each of one or a plurality of factors, a contribution to a prediction model to be identified based on the plurality of factor values for past specimens and a plurality of contributions respectively corresponding to a plurality of points in time in past;

a factor filter unit that minimizes a prediction model error by performing factor filtering processing before performing the factor selection processing, the factor filtering processing including: determining, about each of the one or the plurality of factors, whether a factor value for prediction that is input to a prediction model of power demand to calculate a prediction value of a prediction target of power demand is within a range of a plurality of factor values for past specimens used to identify the prediction model; and excluding a factor, a result of the determination of which is false, and outputting a factor not excluded; and a predicting unit that performs prediction processing including calculating the prediction value of the prediction target by inputting, to the prediction model, a factor value for prediction about each of one or more factors including the factor selected in the factor selection processing and not including the factor excluded in the factor filtering processing, wherein the prediction processing includes:

adjusting, based on a contribution to prediction of each of the one or more factors, a matching degree of the factor to a prediction model to be identified; and inputting a factor value for prediction of each of the one or more factors to the prediction model based on the matching degree after the adjusting, and wherein at least one of the factors is outdoor temperature, wherein the second CPU is programmed to:

based on the calculated prediction value, create an operation schedule including a number of the plurality of generators to be stated and an output distribution of the generators, and execute the created operation schedule to start and operate the number of generators.

2. The prediction system according to claim 1,
wherein the factor filtering processing includes outputting, when an excluded factor is present, at least one factor having an absolutely or relatively strong correlation with the excluded factor among factors, factor values for prediction of which are within a range of a plurality of factor values for past specimens.

3. The prediction system according to claim 1,
wherein the factor selection processing includes identifying, about each of one or a plurality of factors, a prediction model using a plurality of factor values for past specimens of the factor and calculating an evaluation value of the identified prediction model, and wherein the factor selection operation is an operation for selecting the one or two or more factors used in a prediction model having a highest calculated evaluation value.

4. The prediction system according to claim 1,
wherein in the factor filtering processing,
the one or the plurality of factors include a prediction target, the prediction target serving as a factor among the one or the plurality of factors, a factor value for prediction is a calculated prediction value and a plurality of factor values for past specimens are a plurality of values obtained in past.

5. The prediction system according to claim 1,
wherein the factor selection processing includes:
determining whether a difference between information amounts before and after a plurality of factor values for prediction are added to a plurality of factor values for past specimens of all factors selected in the factor filtering processing exceeds a predetermined threshold;

upon determining a result of the determination is false, selecting the one or two or more factors without the factor selection operation as factors used to calculate a prediction value anew; and upon determining the result of the determination is true, performing a selection operation anew in order to select one or two or more factors serving as factors used to calculate a prediction value anew.

6. The prediction system according to claim 1, wherein the factor selection processing includes:
determining whether a value conforming to a prediction error calculated using a prediction model based on a factor value for prediction about each of the selected one or two or more factors exceeds a predetermined threshold;

upon determining a result of the determination is false, selecting the one or two or more factors without the factor selection operation as factors used to calculate a prediction value anew; and upon determining n the result of the determination is true, performing a selection operation anew in order to select one or two or more factors serving as factors used to calculate a prediction value anew.

7. The prediction system according to claim 1,
wherein the factor selecting unit presents information representing at least one of (A) and (B) described below:

(A) about each of one or a plurality of factors, whether a factor value for prediction is within a range of a plurality of factor values for past specimens; and (B) for each of one or a plurality of factors, contributions to prediction before and after the exclusion of the factor.

8. A prediction method for a system including: a central processing unit (CPU); a second CPU coupled to the first CPU; and a plurality of generators generating electric power, the method comprising:

performing factor selection processing, by the first CPU, including performing a factor selection operation, which is an operation for selecting one or two or more factors from one or a plurality of factors;

minimizing a prediction model error, by the first CPU, by performing factor filtering processing before performing the factor selection processing, the factor filtering processing including: determining, about each of the one or the plurality of factors, whether a factor value for prediction input to a prediction model of power demand to calculate a prediction value of a prediction target of power demand is within a range of a plurality of factor values for past specimens used to identify the prediction model; and excluding a factor, a result of the determination of which is false, and outputting a factor not excluded;

performing prediction processing, by the first CPU, including calculating the prediction value of the prediction target by inputting, to the prediction model, a factor value for prediction about each of one or more factors including the factor selected in the factor selection processing and not including the factor excluded in the factor filtering processing, wherein the prediction processing includes:

adjusting, based on a contribution to prediction of each of the one or more factors, a matching degree of the factor to a prediction model to be identified; and inputting a factor value for prediction of each of the one or more factors to the prediction model based on the matching degree after the adjusting, wherein at least one of the factors is outdoor temperature, and where the method further comprising:

by the second CPU, based on the calculated prediction value, creating an operation schedule including a number of the plurality of generators to be stated and an output distribution of the generators; and by the second CPU, executing the created operation schedule to start and operate the number of generators.

* * * * *